*INVENTOR.*
JOHN MACKENZIE MITCHELL

United States Patent Office 3,511,051
Patented May 12, 1970

3,511,051
SPEED GOVERNING SYSTEMS FOR STEAM TURBINES
John Mackenzie Mitchell, Newcastle-upon-Tyne, England, assignor to C. A. Parsons & Company Limited, Newcastle-upon-Tyne, England, a British company
Filed Nov. 2, 1967, Ser. No. 680,073
Claims priority, application Great Britain, Nov. 4, 1966, 49,453/66
Int. Cl. F01k 7/16
U.S. Cl. 60—73    4 Claims

ABSTRACT OF THE DISCLOSURE

A speed governing system for a steam turbine plant in which a valve controlling the admission of steam to a high pressure turbine, for example a governor valve, and a valve controlling the admission of steam to a lower pressure turbine, for example an intercept valve control steam flow from a reheater to an intermediate pressure turbine, are controlled such that between full load and a predetermined part load, say half load, the openings of the two valves are matched by the governing system and then below the predetermined part load, the opening of the second valve is held fixed at the part load opening while the first valve opening continues to vary with load. On shedding of load, both move toward the closed position simultaneously when the load has fallen to a value where the first valve is almost closed.

---

Figure 1:
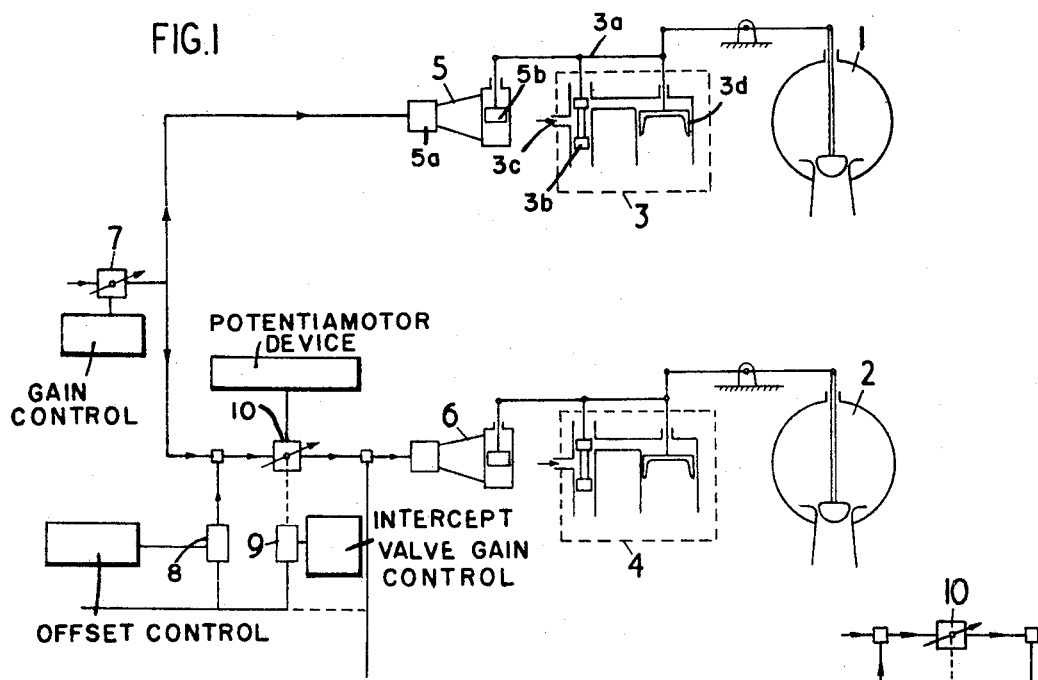

This invention relates to speed governing systems for steam turbines.

In typical steam turbine plant employing reheat, steam is first expanded in a high pressure turbine and then passed to a reheater before being expanded further in an intermediate pressure turbine. The steam then enters one or more low pressure turbines where it expands down to condenser pressure. The speed of the turbines is controlled by a speed sensitive governor which controls the opening of one or more governing valves admitting steam to the high pressure turbine. Intercept valves are located at the inlet to the intermediate pressure turbine downstream of the reheater, and these valves close to prevent overspeeding of the turbine by steam stored in the reheater on the occurrence of an emergency condition such as a sudden complete loss of load on the turbines. The intercept valves are usually kept fully open under normal operating conditions so that the pressure of steam in the reheater, and hence at the inlet to the intermediate pressure turbine, varies with load.

The capacity of the reheater introduces a time lag between movement of the governing valves and the production of a corresponding change of output by the turbines and, on a turbine plant of large output, it is advantageous to introduce continuous control of the intercept valve opening through the speed governor in order to reduce or eliminate this time lag.

If the governing system is such that the intercept valves are caused to move linearly in step with the governing valves and such that when the governor valves are fully open, the intercept valves are fully open, the reheat pressure will be maintained at about the full load value at all loads given that the intercept valves are designed in the same way as the governing valves with suitable means to linearize the relationship between steam mass flow and governor signal.

While the maintenance of the pressure of steam in the reheater at full load value is acceptable down to about half full load, the restriction in the expansion of the steam in the high pressure turbine with full load steam pressure in the reheater produces an undesirable increase in steam temperature at the exhaust of the high pressure turbine. In addition problems due to windage and churning by the turbine blades arise under low steam flow conditions.

Such problems can be met not only in plant employing reheat but also in certain types of process plants such as those employing pass-out turbines.

The object of the present invention is to provide a speed governing system for a steam turbine plant in which the above difficulties are substantially overcome or avoided.

The invention consists in a speed governing system for a steam turbine plant of the kind comprising a high pressure turbine and at least one lower pressure turbine, there being at least one governing valve controlling the admission of steam to the high pressure turbine and at least one further valve controlling the flow of steam from the high pressure turbine to the lower pressure turbine, in which governing system control means are provided which match the opening of the further valve to that of the governor valve over a first range of load between a predetermined part load, and full load the control means acting to maintain a valve opening for the further valve which is larger than the governing valve opening for a second range of load below the predetermined part load and at the same time acting to increase the rate at which the further valve is capable of closing in the second load range so that both the governing and further valve can close simultaneously in response to a predetermined condition.

The invention also consists in a speed governing system in accordance with the preceding paragraph applied to steam turbine plant employing reheat whereby steam leaving the high pressure turbine is passed to a reheater before entering the lower pressure turbine, with the further valve being an intercept valve located between the reheater and the lower pressure turbine.

The invention also consists in a speed governing system in accordance with either of the preceding two paragraphs in which the part of the control means matching the opening of the governing valve and the further valve is responsive to changes in governor setting while that part of the control means acting to maintain a valve opening for the further valve which is greater than the opening of said governing valve and also to increase the rate at which the further valve is capable of closing, is responsive to changes in output from the steam turbine plant.

The invention also consists in a speed governing system in accordance with the first of the preceding two paragraphs in which means are provided to vary the pressure of steam in the reheater with a change in load on the turbines, with the means acting to maintain a substantially constant reheat pressure over the said first range of load and a pressure changing linearly with load over the second load region.

The invention also consists in a speed governing system for steam turbine plant substantially as described hereinbelow with reference to the accompanying drawings.

Figure 1A:
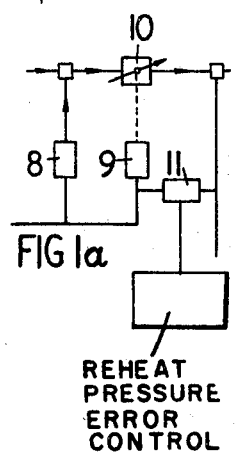
Figure 2:
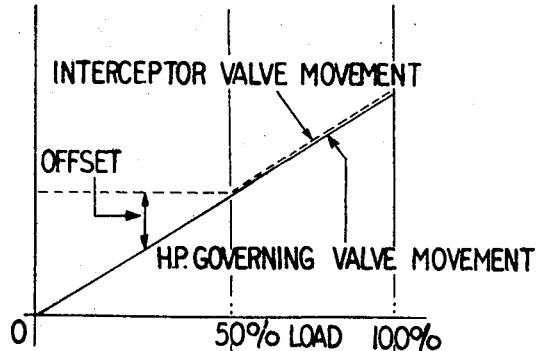
Figure 3:
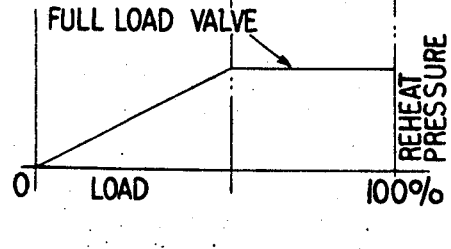
Figure 1B:
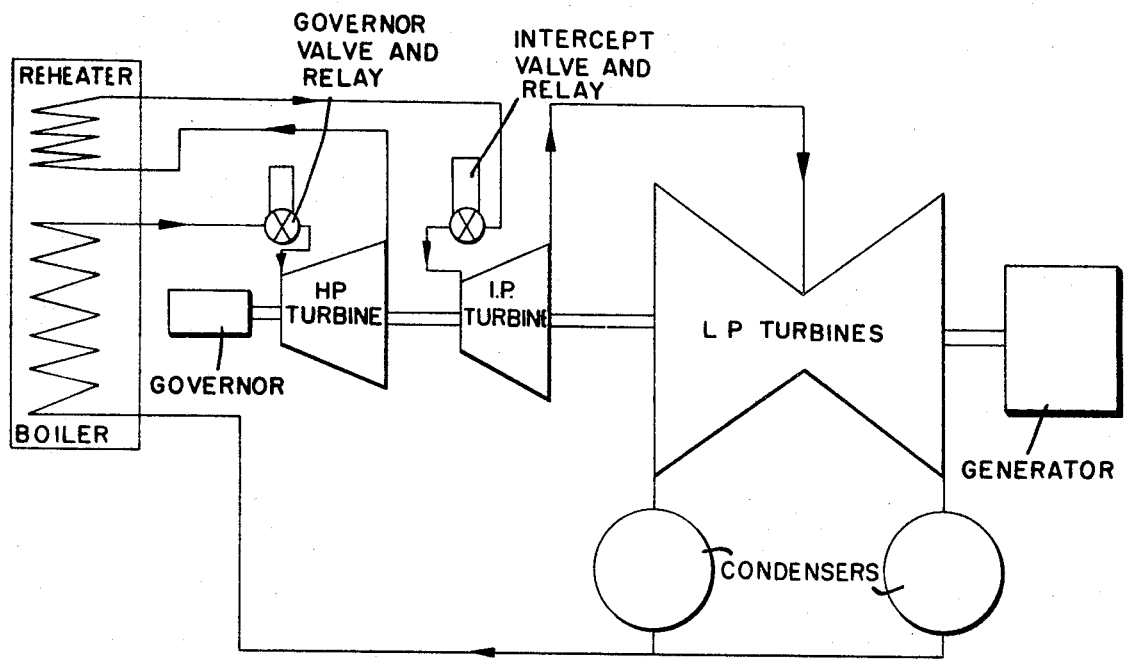
Figure 4:
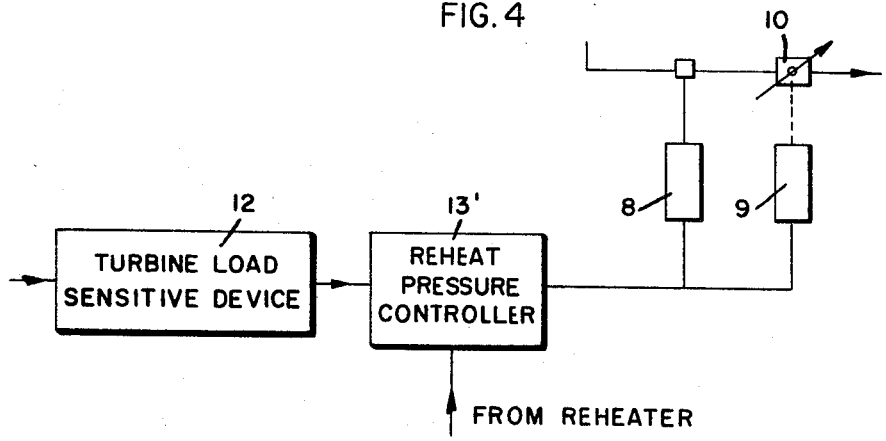

In the accompanying drawings:

FIG. 1 is a view diagrammatically illustrating a governing system for a reheat steam turbine plant in accordance with one embodiment of the invention, FIG. 1a is a diagrammatic view of a detail of a modified system of FIG. 1, FIG. 1b is a diagrammatic view of a typical steam turbine plant with reheat to which the invention is applicable, FIG. 2 shows the variation of intercept valve movement and governing valve movement with load as achieved with the governing system of FIG. 1, FIG. 3 shows the variation of reheat pressure with load achieved by the governing system of FIG. 1, and FIG. 4 is a diagrammatic view of a modification of a governing system of FIG. 1 in which means are provided for varying the pressure of the steam in a reheater with change in load on the turbines.

In carrying the invention into effect in the forms illustrated by way of example and referring to FIG. 1, a speed governing system is illustrated for a steam turbine plant employing reheat and a typical example of such a plant is shown in FIG. 1b.

A governing valve 1 controls the flow of steam to a high pressure turbine (not shown) and an intercept valve 2 controls the flow of steam to a lower pressure turbine (not shown) from a reheater in a known manner. Movement of the governing and intercept valves is controlled by the turbine governor via a relay 3 in the case of the governing valve 1 and relay 4 in the case of the intercept valve 2.

Relay 3 is operable under the control of an electro-hydraulic servo-valve 5 and relay 4 is operable under the control of electro-hydraulic servo-valve 6. The servo-valve 5 comprises essentially an electrically operated valve 5a, such as a solenoid operated valve which controls the flow of hydraulic fluid to one side or the other of a plunger 5b. Movement of the plunger 5b moves, through linkage 3a, the plunger of a hydraulic relay 3b. Movement of this plunger controls the flow of power fluid through an inlet 3c to a power piston 3d, movement of which actuates valve 1.

The servo-valve 6 and relay 4 operate in a similar manner to actuate valve 2'. The valves 5 and 6 are responsive to a signal from an electric speed governor on the turbine shaft and act to move the governing valve and the intercept valve so that their openings are matched over a predetermined range of load on the turbine, for example, in the range between full-load and half full-load. Thus, when the turbine plant is operating at full-load, both valves 1 and 2 would be fully open and then at loads down to say half full-load, the openings would be reduced in step with one another. Likewise, if the load should increase in the load range from half full-load to full-load, the openings of the valves would be increased in step with one another. Over this load range the reheat pressure would remain substantially constant at its full-load value.

In the governing system illustrated in FIG. 1, an electric governor provides a control signal in the form of a voltage proportional to the turbine shaft speed. A potentiometer 7 enables a predetermined fraction of this voltage to be transmitted as an input signal to the electro-hydraulic servo valve 5 and to a control channel feeding the electro-hydraulic servo valve 6.

By adjustment of the setting of the potentiometer 7 the speed gain of the governing system is varied. In this manner, the change in steam mass flow admitted by each of the valves 1 and 2 for a given change of turbine speed can be adjusted.

Should the turbine load lie outside the aforementioned predetermined range, for example, below half full-load, devices 8 and 9 are provided which modify the signal in the control channel feeding the electro-hydraulic servo-valve 6 to maintain for a given load a larger opening on valve 2 than on valve 1, while at the same time increasing the rate at which valve 2 closes in response to a given rate of change of the input signal to the control channel so that both valve 1 and valve 2 can close simultaneously in response to a predetermined condition, such as, a complete shedding of the load on the turbine. For example, the device 8 may be a potentiometer acting in conjunction with a fixed voltage to produce a variable output voltage that is added to the control signal from the potentiometer 7, and the device 9 changes the setting of a variable potentiometer 10 to alter the gain in the control channel feeding the electro-hydraulic servo-valve 6.

Due to the fact that over the lower load range the intercept valve opening is greater than the governing valve opening, the steam pressure in the reheater over this lower load range varies with the load on the turbine. The devices 8 and 9 are made responsive to the load on the turbine, for example through a watt-meter device associated with an electrical generator driven by the turbine plant.

FIG. 2 shows variation of the governing valve movement and the intercept valve movement for a typical arrangement. If the load on the turbine varies in the range between half full-load and full-load, the openings of the two valves are matched at all times. In the operating range below half full-load, the intercept valve opening remains constant at the half full-load value while the opening of the governing valve continues to vary in a linear manner with load.

FIG. 3 shows a typical variation of reheat pressure with the load obtainable by controlling the valve openings in the manner shown in FIG. 2. The reheat pressure remains constant while the load on the turbine is in the range half full-load to full-load, but outside this range, the reheat pressure varies in a linear manner with the load as shown. If the openings of the governing and intercept valves or other factors are such that the desired variation of reheat pressure is not obtained with the desired degree of accuracy, a control device 11 (FIG. 1a) can be included to provide a further voltage signal which is added to the output of the potentiometer 10 to modify further the input to the valve 6 to make the necessary corrections to the intercept valve opening so as to give the desired value of reheat pressure at any given load.

An alternative arrangement illustrated in FIG. 4 is to have a device 12 responsive to the load on the turbine controlling the reheat pressure independently through a reheat pressure control device 13' so that the reheat pressure is varied in the desired manner, and the devices 8 and 9 can then be made responsive to reheat pressure instead of a signal from the governor.

While in the above description reference has been made to a load range of full-load to half full-load and a load range below half full-load, other load ranges can be chosen to suit circumstances. It may, for example, be desirable to arrange for the reheat pressure to fall below its full load value when the load on the turbine falls below say, 60% full load.

While the devices 8 and 9 and the governing system have been described as devices responsive to electrical signals from the turbine governor devices or responsive to governor induced pressure changes in a hydraulic circuit both may be used.

The action of the variable potentiometer 10 in securing simultaneous closing of valves 1 and 2 in the event of the load falling rapidly to zero will be illustrated by means of a numerical example.

For the purpose of illustration, it is assumed that a signal of 10 volts applied simultaneously to electro-hydraulic servo-valves 5 and 6 will hold valves 1 and 2 fully open in the full-load condition and that progressive reduction in this signal will reduce the opening of valves 1 and 2 in step so that the valves close when the signal is zero.

If the potentiometer 10 is at the setting such that its input and output voltages are equal and no voltages are added by devices 8 and 11, a variation of voltage at the output of the potentiometer 7 will cause the openings of valves 1 and 2 to vary in step.

Thus, if the input voltage is 8 volts, the valves 1 and 2 will be held at positions corresponding to 80% load with full load reheater pressure.

If the input voltage is 5 volts, the valves 1 and 2 will be held at positions corresponding to 50% load with full reheater pressure.

If the input signal is 2.5 volts, the valve 1 is at a position corresponding to 25% load but the device 9 will have altered the setting of the potentiometer 10 so that the output signal is double the input signal. The input signal to the electro-hydraulic servo-valve 6 is thus 5 volts so the valve 2 is held at the same opening as at half-load.

In the event of the load falling rapidly to zero, the speed governor will reduce the input signal to the device 7 rapidly to zero volts, thus closing the valve 1. The device 9 is provided with a time delay so that the setting of the potentiometer 10 changes relatively slowly so that during a rapid reduction of the load from 25% load, the setting of the potentiometer 10 remains substantially at the 25% load setting so the output voltage falls at twice the rate of the input voltage. By this means, the valve 2 closes at a faster rate than valve 1 and the two valves approach the fully closed position simultaneously.

In the foregoing example, the desired effect of the interceptor valve opening in excess of the H.P. governing valve opening is obtained entirely by the potentiometer 10. For a steady-state operation below say 25% load a further increase in the voltage ratio of the potentiometer 10 may increase the overall gain in the control channel to the electro-hydraulic servo-valve 6 to an undesirable extent, for example, from the point of view of stability. The desired effect is then obtained by retaining the setting of the potentiometer 10 at the 25% load value and by adding a suitable voltage through the device 8.

I claim:

1. A speed governing system for steam turbine plant of the kind comprising a high pressure turbine and at least one lower pressure turbine, there being at least one governing valve controlling the admission of steam to the high pressure turbine and at least one further valve controlling the flow of steam from the high pressure turbine to the lower pressure turbine, control means being provided which match the opening of said further valve to that of the governor valve over a first range of load between a predetermined part load and full load, said control means acting to maintain a valve opening for said further valve which is larger than the governing valve opening for a second range of load below said predetermined part load and at the same time acting to increase the rate at which said further valve is capable of closing in said second load range so that both the governing and said further valve approach the fully closed position simultaneously in response to a predetermined condition.

2. The speed governing system as claimed in claim 1 applied to a steam turbine plant employing reheat whereby steam leaving the high pressure turbine is passed to a reheater before entering the lower pressure turbine, and said further valve being an intercept valve located between the reheater and the lower pressure turbine.

3. The speed governing system as claimed in claim 1 in which the part of the control means matching the opening of the governing valve and the further valve is responsive to changes in governor setting while that part of the control means acting to maintain a valve opening for said further valve which is greater than the opening of said governing valve and also to increase the rate at which said further valve is capable of closing, is responsive to changes in output from the steam turbine plant.

4. The speed governing system as claimed in claim 2 in which means are provided to vary the pressure of steam in the reheater with change in load on the turbines, said means acting to maintain a substantially constant reheat pressure over said first range of load and a pressure changing linearly with load over said second load region.

References Cited

UNITED STATES PATENTS

| | | | |
|---|---|---|---|
| 2,586,511 | 2/1952 | Bryant | 60—73 |
| 2,811,837 | 11/1957 | Eggenberger | 60—73 |
| 2,830,441 | 4/1958 | Eggenberger | 60—73 |
| 2,863,289 | 12/1958 | Eggenberger | 60—73 |
| 2,902,831 | 9/1959 | Ipsen et al. | 60—73 |
| 3,097,488 | 7/1963 | Eggenberger et al. | 60—105 X |
| 3,097,489 | 7/1963 | Eggenberger et al. | 60—73 |

CARROLL B. DORITY, Jr., Primary Examiner

U.S. Cl. X.R.

60—105